United States Patent [19]
Ren et al.

[11] Patent Number: 5,617,457
[45] Date of Patent: Apr. 1, 1997

[54] PRESSURIZED-WATER REACTOR WITH INDIVIDUALLY ADAPTED PRESSURE DISTRIBUTION IN THE COOLANT

[75] Inventors: Mingmin Ren; Jürgen Stabel-Weinheimer, both of Erlangen, Germany

[73] Assignee: Siemens Aktiengesellschaft, Munich, Germany

[21] Appl. No.: 529,588

[22] Filed: Sep. 18, 1995

Related U.S. Application Data

[63] Continuation-in-part of PCT/DE94/00256, Mar. 4, 1994.

[30] Foreign Application Priority Data

Mar. 16, 1993 [DE] Germany ............ 43 08 364.1

[51] Int. Cl.⁶ .................................................. G21C 1/04
[52] U.S. Cl. .................. 376/352; 376/285; 376/234; 376/446; 376/449
[58] Field of Search .................................. 376/352, 364, 376/285, 286, 446, 449, 234; 976/DIG. 60

[56] References Cited

U.S. PATENT DOCUMENTS

| | | | |
|---|---|---|---|
| 3,563,303 | 2/1971 | Gilli | 165/1 |
| 3,713,971 | 1/1973 | Van Santen et al. | 376/254 |
| 3,873,419 | 3/1975 | Sletten | 376/352 |
| 3,892,625 | 7/1975 | Patterson | 376/176 |
| 4,762,661 | 8/1988 | Leclercq et al. | 376/209 |
| 4,961,897 | 10/1990 | Chevereau | 376/234 |
| 4,994,234 | 2/1991 | Nylund | 376/445 |
| 5,249,210 | 9/1993 | Nylund et al. | 376/352 |

FOREIGN PATENT DOCUMENTS

| | | |
|---|---|---|
| 0027984 | 10/1981 | European Pat. Off. |
| 0059661 | 9/1982 | European Pat. Off. |
| 0246962 | 11/1987 | European Pat. Off. |
| 0388091 | 9/1990 | European Pat. Off. |
| 2245006 | 4/1973 | Germany |
| 3150477 | 8/1982 | Germany |

OTHER PUBLICATIONS

IAEA Technical Document Vienna, Austria 1988, pp. 62–63, 116–155, "Status of Advanced Technology and Design for Water Reactors: Light Water Reactors".

Primary Examiner—Charles T. Jordan
Assistant Examiner—Meena Chelliah
Attorney, Agent, or Firm—Herbert L. Lerner; Laurence A. Greenberg

[57] ABSTRACT

A pressure vessel of a pressurized-water reactor has an upper part in which coolant is collected in a plenum. The coolant enters the plenum through a grid plate on which tops of the fuel assemblies are supported and the coolant is removed from the plenum laterally. Support columns and control-rod guideways form obstacles to the flow of the coolant which can lead to damming-up below the grid plate with horizontal pressure differences and corresponding horizontal flows. Throttle plates inserted in the top of the fuel assemblies or throttle inserts in apertures in the grid plate produce a uniform pressure in the coolant below the grid plate so that it flows uniformly and in a vertical direction through the individual fuel assemblies.

8 Claims, 5 Drawing Sheets

PRESSURIZED-WATER REACTOR WITH INDIVIDUALLY ADAPTED PRESSURE DISTRIBUTION IN THE COOLANT

CROSS-REFERENCE TO RELATED APPLICATION

This application is a Continuation of International Application PCT/DE94/00256, filed Mar. 4, 1994.

BACKGROUND OF THE INVENTION

Field of the Invention

The invention relates to a pressurized-water reactor having a multiplicity of fuel assemblies being mutually adjacently disposed in the interior of a pressure vessel on a core support at the bottom of the pressure vessel, each of the fuel assemblies containing a bundle of fuel rods disposed around control-rod guide tubes and being supported at apertures in a grid plate by a top carrying a top plate covering the bundle, a plenum being formed above the grid plate inside the pressure vessel, attachments protruding into the plenum at the upper surface of the grid plate, the plenum having a lateral outlet, and the pressure vessel having a device for deflecting a coolant flow from an inlet into the pressure vessel through the core support, for distributing it over the individual fuel assemblies and for guiding it along the fuel rods, through passage openings in the top plates of the fuel assemblies and through apertures in the grid plate into the plenum.

Fuel assemblies of pressurized-water reactors contain a bundle of fuel rods which are disposed around control-rod guide tubes, with the bundle of fuel rods being covered by a top plate in the top of the fuel assembly. Inside a pressure vessel, a multiplicity of such fuel assemblies are disposed adjacently on a core support at the bottom of the pressure vessel and are supported with their top parts on the apertures of a grid plate. Formed above the grid plate inside the pressure vessel is a plenum into which attachments on the upper surface of the grid plate protrude. The plenum contains a lateral outlet, such as one or more outlet nozzles for a coolant flow. The coolant flow is guided by appropriate devices from an inlet in the pressure vessel to the core support at the bottom of the pressure vessel, is distributed there over the individual fuel assemblies, then flows along the fuel rods and emerges through passage openings in the top plates of the fuel assemblies in order to enter the plenum through the apertures in the grid plate.

In this case, the core support at the bottom of the pressure vessel can already carry throttle plates or inserts in order to distribute the coolant flow uniformly over the entire cross section of the pressure vessel. The interstices between the fuel rods and the guide tubes of a fuel assembly are connected to one another and to the interstices between adjacent fuel assemblies so that coolant flows directed transversely to the fuel assemblies can occur in the pressure vessel. This may be desirable in order to achieve thorough mixing between hotter and cooler regions of the coolant, for which purpose spacers with appropriate deflection devices may be provided on different axial planes of the fuel assembly. Such spacers are required in any case in order to fix the lateral spacing of the fuel rods. However, apart from such spacers supporting the fuel rods, their own grid structures may also be provided additionally to hold further mixing devices on the fuel assemblies.

The attachments which protrude from the upper surface of the grid plate into the dome of the pressure vessel (that is to say the plenum for the coolant heated on the fuel rods) are necessary, for example, to support the grid plate mechanically and to receive the control rods which can be introduced into the control-rod guide tubes. The partial flows of the coolant, into which the coolant is divided at the lower core support and which emerge after flowing through the individual fuel assemblies through the individual apertures in the grid plate, therefore have to overcome an individual flow resistance on their path to the outlet, which flow resistance is determined by the length of the respective flow path and the obstacles disposed in that path. A pressure thus occurs in the coolant when passing through the passage openings in the plates, which pressure is distributed inhomogeneously over the cross section of the pressure vessel. When passing through the top plates, the coolant thus suffers damming-up which, due to the geometrical configuration of the attachments on the top plate and of the lateral outlet, may be different for each fuel assembly and already leads to pressure differences and resultant transverse flows in the axial zone of the pressure vessel in which the fuel rods are seated.

The pressure differences are already one of the causes of bending of the fuel rods and fuel assemblies. Additionally, the transverse flows cause the fuel rods and the structural elements of the fuel assemblies to vibrate and to be subjected to mechanical loading. In total, other physical loads on the fuel assemblies are thus intensified, in such a way that damage may occur on the fuel assemblies.

In order to avoid horizontal pressure differences and transverse flows, the coolant can be guided vertically through the plenum in the dome of the pressure vessel and conducted away through corresponding vertical outlet nozzles which take into account the geometry of the attachments on the grid plate. However, that leads to a complicated construction or an impermissible structural height of the pressure vessel.

SUMMARY OF THE INVENTION

It is accordingly an object of the invention to provide a pressurized-water reactor with individually adapted pressure distribution in the coolant, which overcomes the hereinafore-mentioned disadvantages of the heretofore-known devices of this general type and which avoids an inhomogeneous flow speed inside a reactor pressure vessel in such reactors with undesirable transverse flows in an axial region in which the fuel rods are seated, through the use of an individual adaptation of flow conditions in a region of the tops of the fuel assemblies and of a grid plate supporting the tops.

This object is achieved by an individual throttling of the coolant flow when it passes through the individual tops of the fuel assemblies or, at the latest, when it passes through the grid plate.

With the foregoing and other objects in view there is provided, in accordance with the invention, a pressurized-water reactor, comprising a pressure vessel having a bottom, an inlet, a lateral outlet, and an interior; a core support disposed at the bottom of the pressure vessel; a grid plate having apertures formed therein and having an upper surface, the grid plate defining a plenum above the grid plate in the interior of the pressure vessel, the plenum leading to the lateral outlet; plenum attachments protruding into the plenum at the upper surface of the grid plate; a multiplicity of mutually adjacent fuel assemblies disposed in the interior of the pressure vessel on the core support, each of the fuel assemblies containing a bundle of fuel rods and a top carrying a top plate covering the bundle and having passage openings formed therein, and each of the fuel assemblies being disposed around control-rod guide tubes and being supported at the apertures in the grid plate by the top; a device disposed in the pressure vessel for deflecting a coolant flow from the inlet, into the pressure vessel and through the core support, for distributing the coolant flow over the individual fuel assemblies and for guiding the coolant flow along the fuel rods, through the passage openings in the top plates of the fuel assemblies, through the apertures in the grid plate and into the plenum; and throttle plates each being attached in the top of a respective one of a plurality of the fuel assemblies, the throttle plates having throttle openings formed therein for an individual adaptation of pressure in the coolant flowing through the top of the respective fuel assembly. These features provide such an individual throttling when the flow passes through the top of the fuel assembly.

In accordance with another feature of the invention, the throttle openings in the throttle plate have a smaller cross section than the passage openings in the top plate, the throttle openings have a cross-sectional area, and the greatest part of the cross-sectional area of the throttle openings is disposed above the passage openings in the top plate.

In accordance with a further feature of the invention, the throttle plate is attached releasably in the top of the fuel assembly.

In accordance with an added feature of the invention, the throttle plate and the top plate are bolted together to an upper end of the control-rod guide tubes.

In accordance with an additional feature of the invention, there are provided common holding-down devices holding the top plate and the throttle plate in the top of the fuel assembly.

In accordance with yet another feature of the invention, each of the throttle plates is disposed above a respective one of the top plates.

With the objects of the invention in view, there is also provided a pressurized-water reactor, comprising a pressure vessel having a bottom, an inlet, a lateral outlet, and an interior; a core support disposed at the bottom of the pressure vessel; a grid plate having apertures formed therein and having an upper surface, the grid plate defining a plenum above the grid plate in the interior of the pressure vessel, the plenum leading to the lateral outlet; plenum attachments protruding into the plenum at the upper surface of the grid plate; a multiplicity of mutually adjacent fuel assemblies disposed in the interior of the pressure vessel on the core support, each of the fuel assemblies containing a bundle of fuel rods and a top and being supported by the top at the apertures in the grid plate; a device disposed in the pressure vessel for deflecting a coolant flow from the inlet into the pressure vessel, for distributing the coolant flow through the core support over the individual fuel assemblies and for guiding the coolant flow along the fuel rods, through the tops of the fuel assemblies and the apertures in the grid plate and into the plenum; and throttle elements associated with a plurality of the apertures in the grid plate, the throttle elements each having at least one passage opening formed therein for an individual adaptation of pressure in the coolant emerging from the tops of the fuel assemblies supported at the apertures in the grid plate. These features provide a corresponding individual throttling when the flow passes through the apertures in the grid plate. In accordance with a concomitant feature of the invention, the throttle inserts are inserted in the apertures in the grid plate.

Correspondingly, a throttle plate may thus be attached in the top of a plurality of fuel assemblies (in particular in each case above the top plate). The throttle plate contains one or more throttle openings for the individual adaptation of the pressure in the coolant which flows through the top of the respective fuel assembly. However, a plurality of grid apertures, on which the respective fuel assemblies are supported, may also have throttle elements in each case with one or more passage openings which bring about the individual adaptation of the pressure in the coolant that flows through the top of the fuel assemblies.

Other features which are considered as characteristic for the invention are set forth in the appended claims.

Although the invention is illustrated and described herein as embodied in a pressurized-water reactor with individually adapted pressure distribution in the coolant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
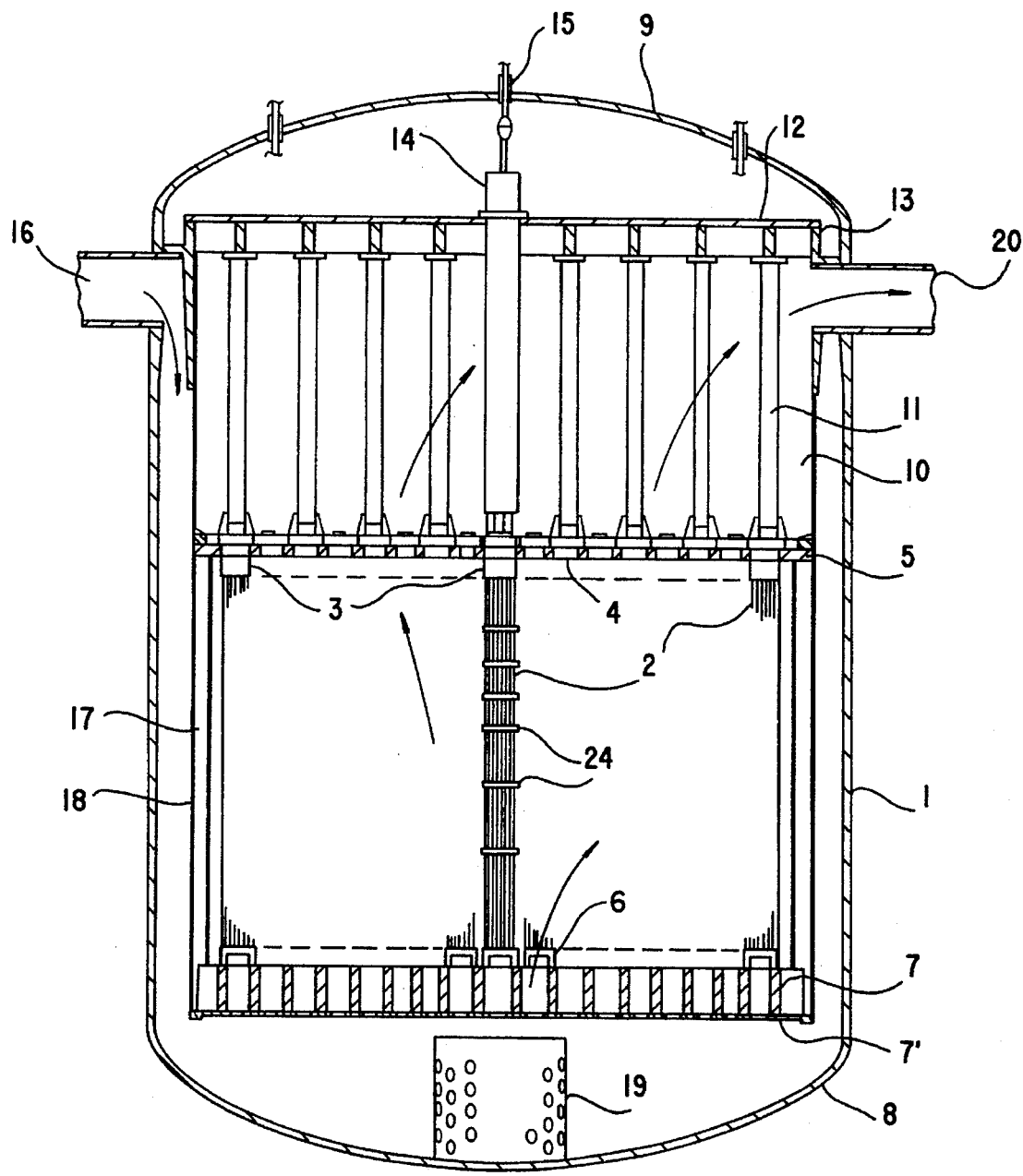
FIG. 1 is a fragmentary, diagrammatic, sectional view of a reactor pressure vessel for a pressurized-water nuclear reactor.

Referring now to the figures of the drawing in detail and first, particularly, to FIG. 1 thereof, there is seen a multiplicity of fuel assemblies 2 which are disposed inside a reactor pressure vessel 1. The fuel assemblies are supported by tops or top fittings 3 of the fuel assemblies at apertures or meshes 4 in a grid plate 5. Feet or bottom fittings 6 of the fuel assemblies rest adjacently on a lower core support 7 with a flow distribution plate 7' at a bottom 8 of the pressure vessel 1. A plenum 10 which is below a lid 9 of the pressure vessel is separated by the grid plate 5 from a zone of the pressure vessel containing the fuel assemblies. Support columns 11 protrude from the grid plate, through the plenum 10 up to a top plate 12 above an upper core support 13, to hold the grid plate 5 and the tops of the fuel assemblies. For reasons of clarity, a control-rod guideway 14 is shown above only one fuel assembly. The guideway holds the control rods which can be introduced into control-rod guide tubes of individual fuel assemblies to control the nuclear reaction. The lid therefore bears passages 15 which are assigned to drive elements in each case for a plurality of control rods. Elements 11 and 14 are plenum attachments.

The fuel-assembly zone is surrounded laterally by a core shroud 17 inside a core barrel 18, so that the coolant flowing in through an inlet 16 is guided to a flow skirt 19 at the bottom of the pressure vessel. Elements 17, 18, 19 provide a device for deflecting a coolant flow. In each case the coolant then enters the foot of a fuel assembly from below through the lower core support 7, and flows essentially vertically along the fuel rods to passage openings in the top plate which covers the corresponding fuel assembly at the top of the fuel assembly. The coolant then enters the plenum 10 from the respective fuel assembly through the top 3 of the fuel assembly and enters the aperture 4 of the grid plate 5. In the plenum the coolant is deflected to one or more lateral outlet nozzles or an outlet 20.

Figure 2:
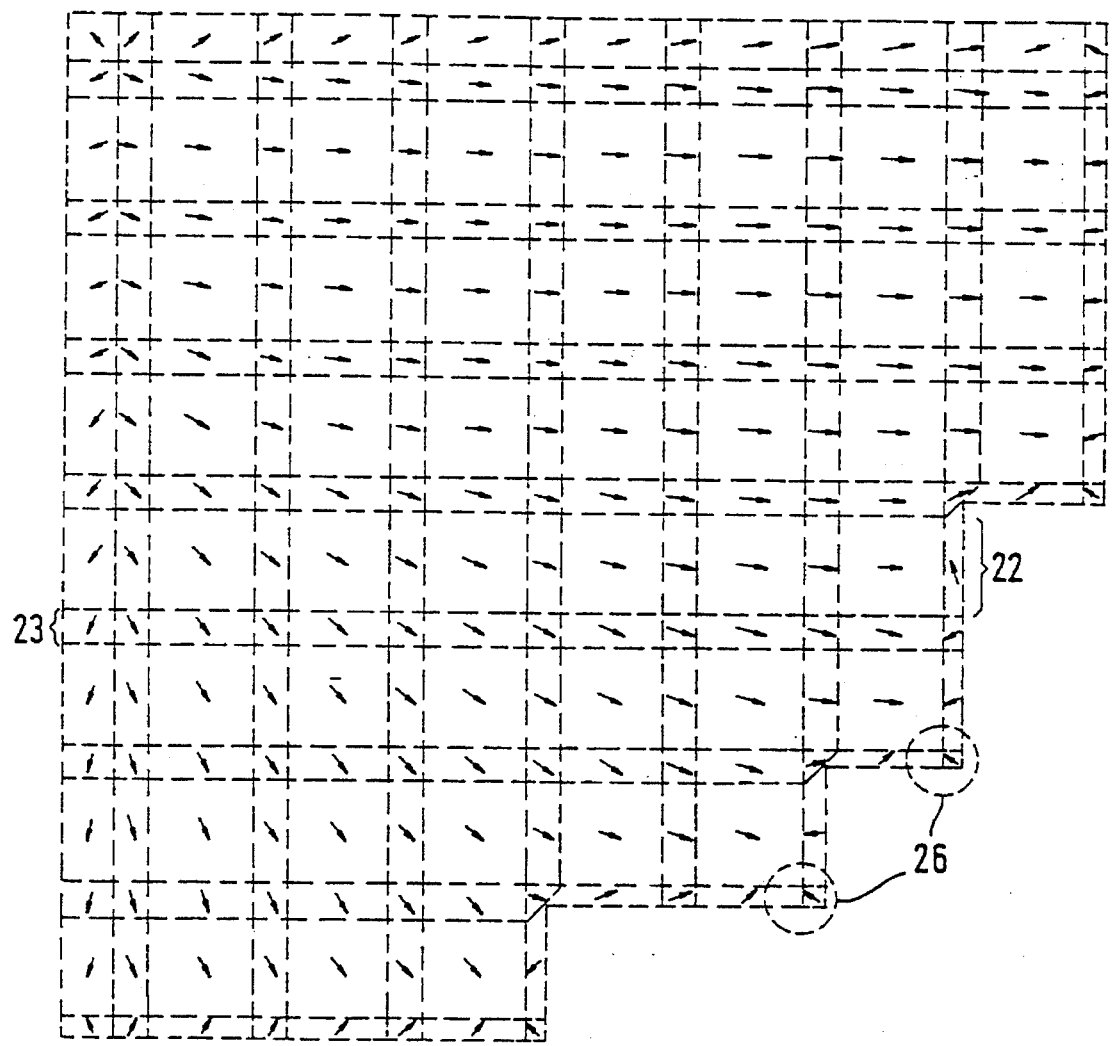
FIG. 2 is a fragmentary, enlarged, sectional view of a typical distribution of a horizontal speed component of the coolant below a grid plate of a conventional reactor.

FIG. 2 shows the horizontal components of the coolant flow which occur within a quadrant of the core shroud. In this case, the fuel assemblies are disposed in rows 22 having an alignment which is shown in FIG. 2. In this case, gaps 23 are formed between the individual rows of fuel assemblies, with the coolant being able to pass through the gaps 23 from one row of fuel assemblies to another in a largely unobstructed manner. These transverse flows are produced by pressure differences below the grid plate. The pressure differences occur due to damming-up which the coolant suffers because of obstructions to flow which it encounters in the plenum after it passes through the grid plate and on the path to the outlet. These pressure differences and flows cause bending and horizontal vibrations, above all in the upper region of the fuel assemblies, which can lead to damage to the fuel rods and fuel assemblies that are bent in any case in the course of reactor operation due to the high temperatures, temperature loading and radiation-related changes.

In order to be certain that a spacing, which is sufficient for the coolant flow, is always ensured between individual fuel rods of a fuel assembly despite this bending, the fuel rods are guided through apertures of spacers 24 shown in FIG. 1 and mechanically supported at different axial positions. It is already known (from European Patent Application 0 246 962 A1, corresponding to U. S. Pat. No. 4,804,516) to select the axial spacing of the spacer grids to be narrower in the upper region of the fuel assembly. However, ruptures of welds or other mechanical damage may occur even on the spacers. FIG. 2 shows some positions 26 at which turbulences and particular mechanical loads occur, for example due to great changes in the flow and the flow direction.

Whereas a controlled transverse flow is desirable per se to increase the thorough mixing and cooling effect and can be produced intentionally by guide surfaces on the spacer webs, such inhomogeneous flow conditions as are shown in FIG. 2 are also undesirable with respect to a uniform cooling of the reactor core.

Whereas in boiling-water reactors the coolant flow, which is already distributed relatively uniformly on a lower grid plate or the lower core support 7 over the different regions of the core cross section, is guided individually in the individual fuel assemblies (the feet of the fuel assemblies contain funnel-shaped, laterally closed transition pieces and the bundle of fuel rods is surrounded laterally by a fuel-assembly water canal), the feet of customary pressurized-water fuel assemblies are formed only of a laterally open frame, and the fuel assemblies are not surrounded laterally by a canal. The invention therefore provides for uniform pressure conditions to be enforced in the fuel assemblies of a pres- surized-water reactor by corresponding throttling of the coolant flow when it enters the plenum 10, thus obviating the cause of the above-mentioned transverse flows below the grid plate.

Figure 3:
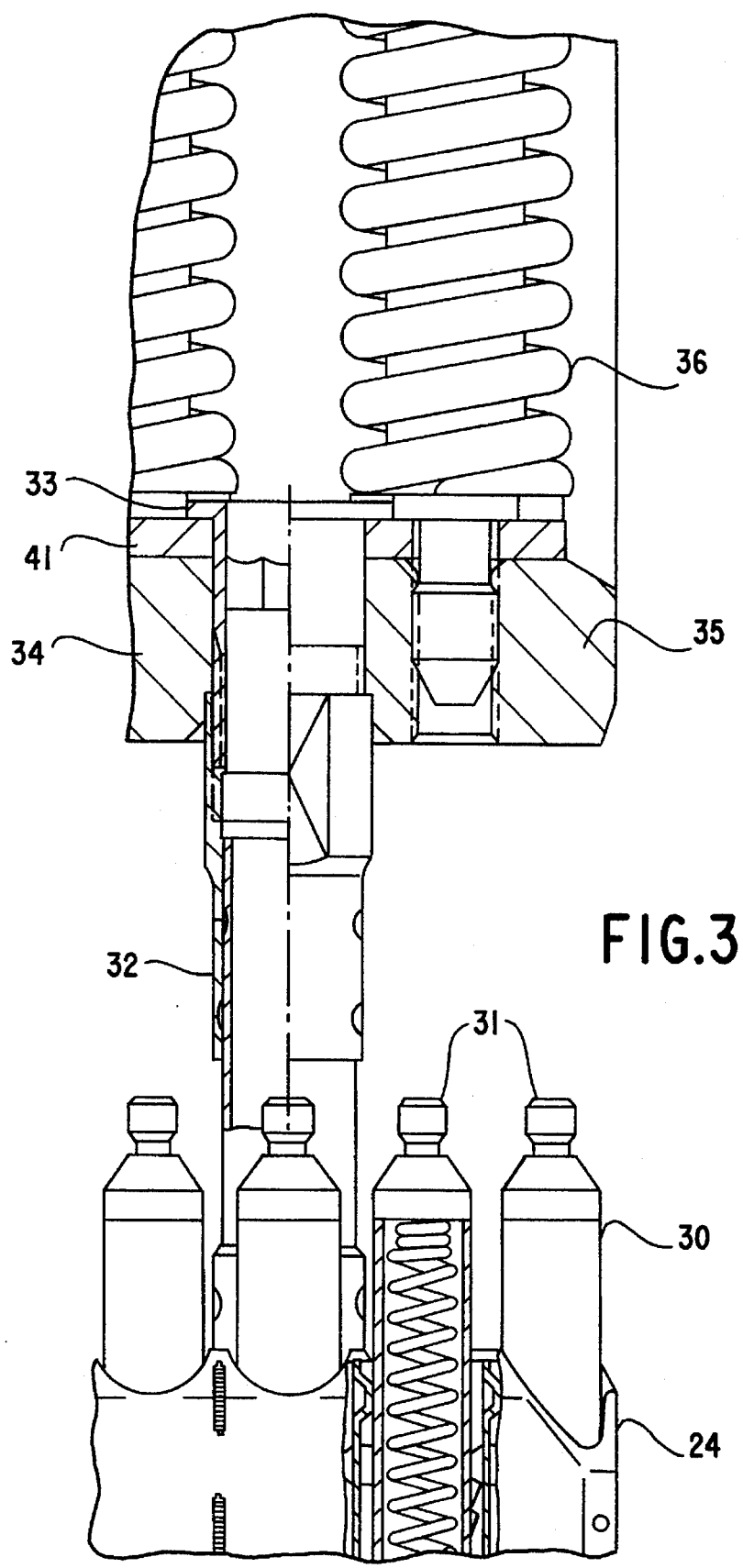
FIG. 3 is an enlarged, fragmentary, cross-sectional view of a top plate and a throttle plate in the top of a fuel assembly, in which the plates are held together by a screw connection of a control-rod guide tube.

FIG. 3 shows a cross section through a top region of a fuel assembly. Upper closure caps 30 of individual fuel rods 31, in which a compensation space is provided through the use of compression springs, for gaseous fission products produced by nuclear operations, are held in the apertures or meshes of a spacer 24. The spacers themselves are supported by control-rod guide tubes 32 which are attached to a top plate 34 by a screwed-on nut 33. A similar attachment is also provided between the guide tubes and the feet 6 of the fuel assemblies, so that the top plate which is supported by a frame 35 of the top of the fuel assembly, the guide tubes with the spacers and the foot part, form a supporting skeleton for the fuel rods. As is also shown in FIG. 5, the frame 35 of the top of the fuel assembly with the associated top plate 34 is supported on the grid plate 5 through the use of compression springs 36.

Figure 4:
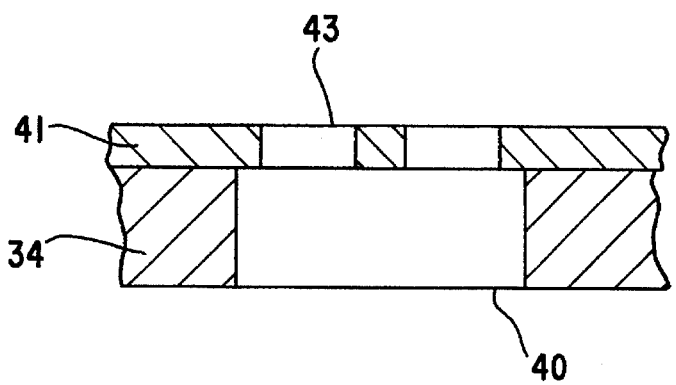
FIG. 4 is a fragmentary, cross-sectional view of a top plate and a throttle plate.

FIG. 4 shows that the top plate 34 has passage openings 40 which are advantageously disposed in such a way that they lie above interstices which are produced between the individual fuel rods 31.

Figure 5:
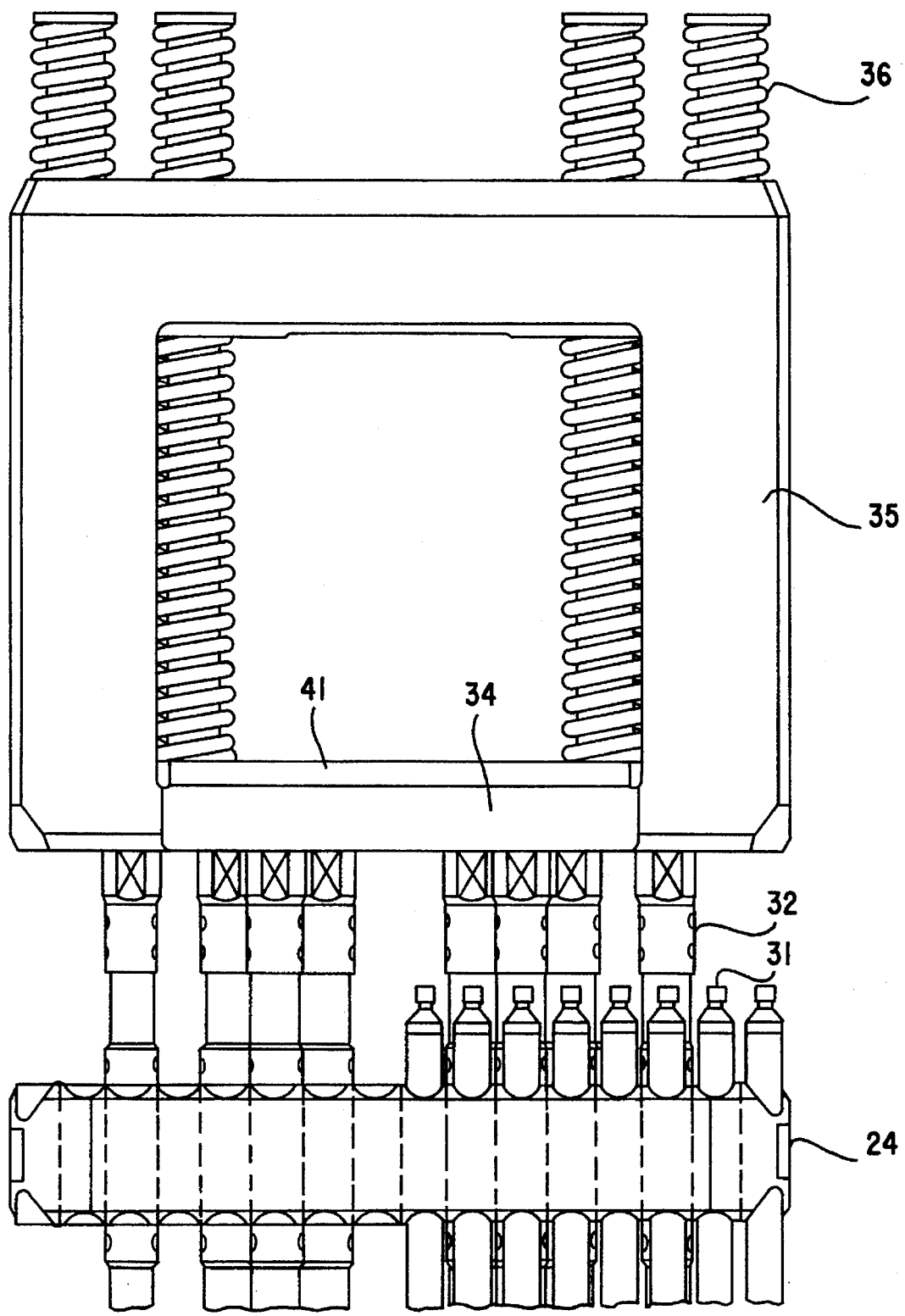
FIG. 5 is a fragmentary, lateral view of a top of a fuel assembly with a throttle plate held by holding-down devices.

In the exemplary embodiments of FIGS. 3 and 5, a throttle plate 41 is releasably attached at least in the top of a plurality of fuel assemblies. The throttle plate can rest, in particular, on the top plate, with the throttle plate 41 being bolted to the top plate 34 through the nut 33 of some control-rod guide tubes 32 in FIG. 3. FIG. 5 shows that the top plate 34 and the throttle plate 41 are advantageously held through common holding-down devices, for example the springs 36, in the top of the fuel assembly.

According to FIG. 4, the throttle plate contains throttle openings 43 which advantageously have, in total, a smaller cross-sectional area than the passage openings 40 in the top plate 34 and lie with the largest part of their cross-sectional area above the passage openings 40.

The configuration of the individual throttle plates and the dimensioning of their passage openings are adapted individually to the position of the respective fuel assembly on the grid plate in such a way that, when the coolant passes through the tops of all of the fuel assemblies, for example, a uniform damming-up is produced everywhere, that is to say no horizontal changes in pressure occur. In this case, however, provision may also be made by appropriate construction of the throttle plates to maintain a particular uniform pattern of weak transverse flows to increase thorough mixing of the coolant.

Figure 6:
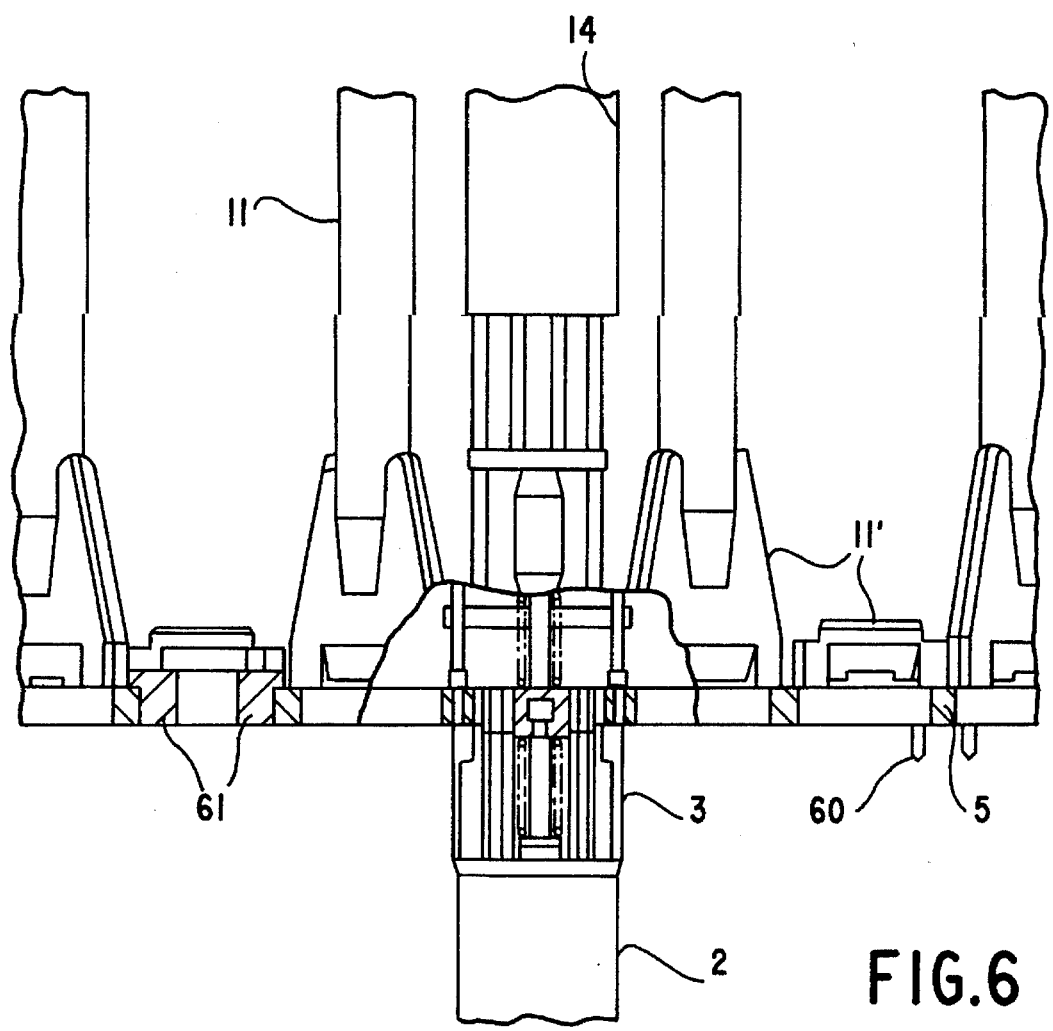
FIG. 6 is a fragmentary, cross-sectional view of the grid plate with its attachments and a throttle element inserted into an aperture in the grid plate.

FIG. 6 shows that the underside of the grid plate 5 can carry fuel assembly alignment pins 60 which engage in corresponding bores in the top parts 3 of the fuel assemblies in order to position the tops of the fuel assemblies at the respective apertures in the grid plate 5. The upper surface of the grid plate 5 carries the control-rod guideways 14, the support columns 11 and holding structures 11' for the tops of the fuel assemblies. Webs of the grid plate 5 form individual apertures, with throttle elements 61 being inserted in at least a plurality of the apertures. During an exchange of used fuel assemblies, the throttle elements can be inserted together with new fuel assemblies in order to adapt the pressure in the coolant, which emerges from the top of the new fuel assemblies supported on the grid apertures, to the pressure which prevailed in the old fuel assembly. If, in the case of such a fuel-assembly exchange, fuel assemblies which have not yet been burnt out completely are transferred to a different site in the reactor core, the throttle elements which are advantageously constructed as inserts for the grid apertures, can again be placed at the old site.

The throttle plates or throttle elements according to the invention thus influence the damming-up occurring in the coolant below the grid plate in such a way that virtually no horizontal pressure differences occur below the grid plate or at least these pressure differences lead to a desirable distribution of the coolant when it enters the plenum. Additionally, they can contribute to the stabilizing of the desired flow, as a result of which even the thermodynamic and hydrodynamic conditions in the reactor core can be calculated and controlled in a simpler manner.

We claim:

1. A pressurized-water reactor, comprising:
  a pressure vessel having a bottom, an inlet, a lateral outlet, and an interior;
  a core support disposed at said bottom of said pressure vessel;
  a grid plate having apertures formed therein and having an upper surface, said grid plate defining a plenum above said grid plate in said interior of said pressure vessel, said plenum leading to said lateral outlet;
  plenum attachments protruding into said plenum at said upper surface of said grid plate;
  a multiplicity of mutually adjacent fuel assemblies disposed in said interior of said pressure vessel on said core support, each of said fuel assembled containing a bundle of fuel rods and a top carrying a top plate covering said bundle and having passage openings formed therein, and each of said fuel assemblies being disposed around control-rod guide tubes and being supported at said apertures in said grid plate by said top;
  a device disposed in said pressure vessel for deflecting a coolant flow from said inlet, into said pressure vessel and through said core support, for distributing the coolant flow over said individual fuel assemblies and for guiding the coolant flow along said fuel rods, through said passage openings in said top plates of the fuel assemblies, through said apertures in said grid plate and into said plenum; and
  throttle plates each being attached in said top of a respective one of a plurality of said fuel assemblies, said throttle plates having throttle openings formed therein for an individual adaptation of pressure in the coolant flowing through said top of said respective fuel assembly, said throttle openings in said throttle plate having a smaller cross section than said passage openings in said top plate, said throttle openings having a cross-sectional area, and the greatest part of said cross-sectional area of said throttle openings being disposed above said passage openings in said top plate.

2. The reactor according to claim 1, wherein said throttle plate is attached releasably in said top of said fuel assembly.

3. The reactor according to claim 1, wherein said throttle plate and said top plate are bolted together to an upper end of said control-rod guide tubes.

4. The reactor according to claim 1, including common holding-down devices holding said top plate and said throttle plate in said top of said fuel assembly.

5. The reactor according to claim 1, wherein each of said throttle plates is disposed above a respective one of said top plates.

6. A pressurized-water reactor, comprising:
  a pressure vessel having a bottom, an inlet, a lateral outlet, and an interior;
  a core support disposed at said bottom of said pressure vessel;
  a grid plate having apertures formed therein and having an upper surface, said grid plate defining a plenum above said grid plate in said interior of said pressure vessel, said plenum leading to said lateral outlet;
  plenum attachments protruding into said plenum at said upper surface of said grid plate;
  a multiplicity of mutually adjacent fuel assemblies disposed in said interior of said pressure vessel on said core support, each of said fuel assemblies containing a bundle of fuel rods and a top and being supported by said top at said apertures in said grid plate;
  a device disposed in said pressure vessel for deflecting a coolant flow from said inlet into said pressure vessel, for distributing the coolant flow through said core support over said individual fuel assemblies and for guiding the coolant flow along said fuel rods, through said tops of said fuel assemblies and said apertures in said grid plate and into said plenum; and
  throttle elements associated with a plurality of said apertures in said grid plate, said throttle elements each having at least one passage opening formed therein for an individual adaptation of pressure in the coolant emerging from said tops of said fuel assemblies, said throttle elements being supported at said apertures in said grid plate above said tops of said fuel assemblies.

7. The reactor according to claim 6, wherein said throttle inserts are inserted in said apertures in said grid plate.

8. A pressurized-water reactor, comprising:
  a pressure vessel having a bottom, an inlet, a lateral outlet, and an interior;
  a core support disposed at said bottom of said pressure vessel;
  a grid plate having apertures formed therein and having an upper surface, said grid plate defining a plenum above said grid plate in said interior of said pressure vessel, said plenum leading to said lateral outlet;
  plenum attachments protruding into said plenum at said upper surface of said grid plate;
  a multiplicity of mutually adjacent fuel assemblies disposed in said interior of said pressure vessel on said core support, each of said fuel assembled, containing a bundle of fuel rods and a top carrying a top plate covering said bundle and having passage openings formed therein, and each of said fuel assemblies being disposed around control-rod guide tubes and being supported at said apertures in said grid plate by said top;
  a device disposed in said pressure vessel for deflecting a coolant flow from said inlet into said pressure vessel and through said core support, for distributing the coolant flow over said individual fuel assemblies and for guiding the coolant flow along said fuel rods, through said passage openings in said top plates of the fuel assemblies, through said apertures in said grid plate and into said plenum; and
  throttle plates each being attached in said top of a respective one of a plurality of said fuel assemblies, said throttle plates having throttle openings formed therein defining a flow cross section for coolant flowing through said top of said respective fuel assembly; and
  said flow cross section of one respective fuel assembly being greater than said flow cross section of a respective other fuel assembly.

* * * * *